(12) United States Patent
Sinzinger et al.

(10) Patent No.: US 8,369,566 B2
(45) Date of Patent: Feb. 5, 2013

(54) REMOTE CONTACTLESS STEREOSCOPIC MASS ESTIMATION SYSTEM

(75) Inventors: Eric D. Sinzinger, Odenton, MD (US); Bradley D. Null, Austin, TX (US)

(73) Assignee: Texas Tech University System, Lubbock, TX (US)

( * ) Notice: Subject to any disclaimer, the term of this patent is extended or adjusted under 35 U.S.C. 154(b) by 496 days.

(21) Appl. No.: 12/771,607

(22) Filed: Apr. 30, 2010

(65) Prior Publication Data
US 2010/0289879 A1  Nov. 18, 2010

Related U.S. Application Data

(60) Provisional application No. 61/174,564, filed on May 1, 2009.

(51) Int. Cl.
*G06K 9/00* (2006.01)
*G01C 3/08* (2006.01)

(52) U.S. Cl. .......... 382/100; 382/203; 356/4.03

(58) Field of Classification Search .......... 382/100, 382/103, 106–107, 110, 123, 154, 155, 162, 382/168, 173, 181, 193, 199, 203, 209, 219, 382/232, 254, 274, 276, 286–294, 305, 312, 382/321; 380/245; 452/157; 705/7.25; 356/603, 356/4.03
See application file for complete search history.

(56) References Cited

U.S. PATENT DOCUMENTS

| | | | |
|---|---|---|---|
| 4,963,035 A | 10/1990 | McCarthy et al. | |
| 5,576,949 A | 11/1996 | Scofield et al. | |
| 6,549,289 B1 * | 4/2003 | Ellis | 356/603 |
| 6,678,396 B2 * | 1/2004 | Bartle | 382/110 |
| 7,128,024 B2 | 10/2006 | Doyle, II | |
| 7,399,220 B2 * | 7/2008 | Kriesel et al. | 452/157 |
| 7,399,320 B2 | 7/2008 | Burgaud et al. | |
| 7,603,284 B2 * | 10/2009 | Stroman et al. | 705/7.25 |
| 7,853,046 B2 * | 12/2010 | Sharony | 382/110 |
| 2006/0002553 A1 * | 1/2006 | Krien | 380/245 |

FOREIGN PATENT DOCUMENTS

| | | |
|---|---|---|
| DE | 10058691 A1 | 6/2002 |
| JP | 61114111 A | 3/1986 |
| JP | 06003181 A | 1/1994 |
| KR | 1020020024588 A | 4/2002 |

OTHER PUBLICATIONS

International Search Report and Written Opinion for PCT/US2010/033214, dated Jan. 3, 2011, 5 pages.

* cited by examiner

*Primary Examiner* — Seyed Azarian
(74) *Attorney, Agent, or Firm* — Chainey P. Singleton; Edwin S. Flores; Chalker Flores, LLP

(57) ABSTRACT

A contactless system and method for estimating the mass or weight of a target object is provided. The target object is imaged and a spatial representation of the target animal is derived from the images. A virtual spatial model is provided of a characteristic object of a class of object to which the target object belongs. The virtual spatial model is reshape to optimally fit the spatial representation of the individual animal. Finally, the mass or weight of the target object is estimated as a function of shape variables characterizing the reshaped virtual object.

15 Claims, 4 Drawing Sheets

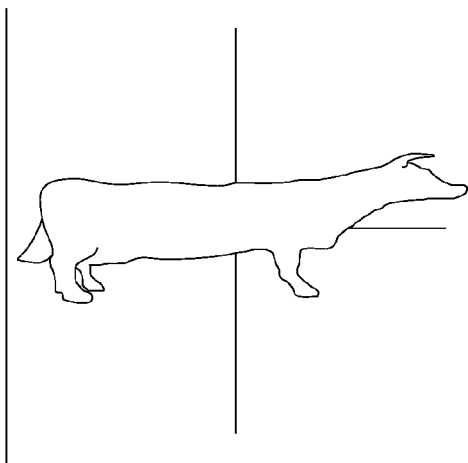
FIG. 3
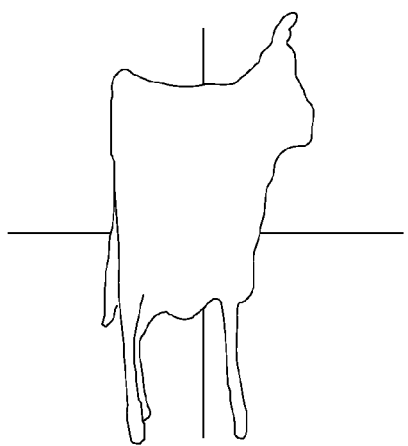
FIG. 4
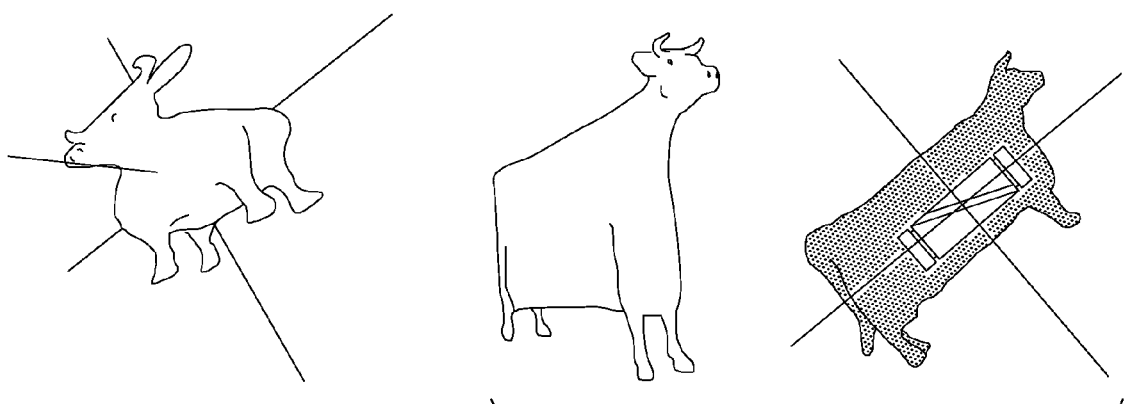
FIG. 5 FIG. 6
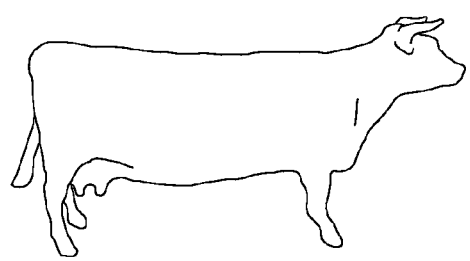
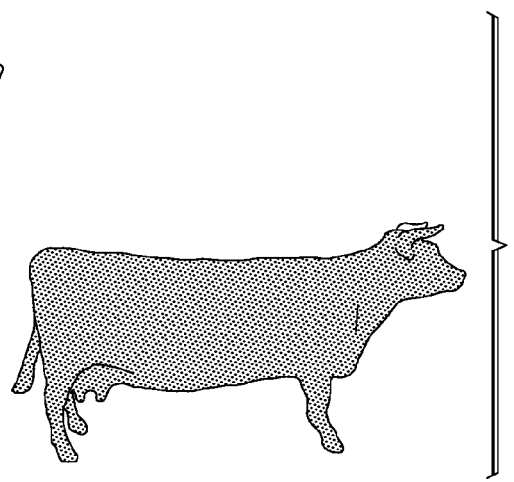
FIG. 7

REMOTE CONTACTLESS STEREOSCOPIC MASS ESTIMATION SYSTEM

CROSS-REFERENCE TO RELATED APPLICATIONS

This application claims priority to U.S. Provisional Application Ser. No. 61/174,564, filed May 1, 2009, entitled "Remote Contactless Stereoscopic Mass Estimation System" the contents of which is incorporated by reference herein in its entirety.

TECHNICAL FIELD OF THE INVENTION

This invention relates generally to imaging systems, and more specifically, to systems that use imaging techniques to estimate the mass or weight of an animal.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Animal weight is a significant indicator of animal health, development, and likely yield. It is also useful to know the weight of animal before administering medicine, as dosage amounts are typically determined by the animal's estimated weight. Cattle and other livestock are conventionally weighed by being placed on a scale. Typically, the animal is forced through a narrow passageway called a "cattle chute" onto a scale. Then, the animal is clamped from both sides with a squeeze scale. The process agitates the animal. Transportation of the animal to the scale also stresses the animal. During the time the animal is transported to and squeezed into the scale, the animal often loses weight. Sometimes, aggregate pen scales are used.

U.S. Pat. No. 4,963,035 to McCarthy et al. discloses an image-processing-based fish sorting machine. The inventor suggests, on column 6, lines 25-29, that the machine could, as one of many possible functions, estimate the weight of a fish as a function of the area of the fish on an image. McCarthy et al. does not teach or suggest fitting a multi-dimensional virtual fish model having configurable shape parameters to the fish image, or of estimating the weight of the fish as a function of any adjusted-to-best-fit shape parameters of a virtual model.

U.S. Pat. No. 5,576,949 to Scofield et al. discloses a system to evaluate the "economic potential" of an animal, based on several sensed characteristics, including images of the animal and a weight scale. Although the system includes a conventional weight scale, Scofield et al. briefly remarks, at col. 33, lines 52-55, that the weight could alternatively be estimated from the height and width measurements obtained from captured images of the animal. Scofield et al. does not, however, teach or suggest fitting a multi-dimensional virtual animal model having configurable shape parameters to the animal image, or of estimating the weight of a live animal as a function of any adjusted-to-best-fit shape parameters of a virtual model.

U.S. Pat. No. 6,549,289 to Ellis teaches projecting a light pattern, such a light grid or pattern of light dots, onto a target animal, photographing the reflected pattern with two cameras, and using triangulation techniques to generate a three-dimensional surface representation of the target animal. Ellis suggests calculating the volume of portions of the target animal from the three-dimensional representation. Ellis does not, however, teach or suggest fitting a multi-dimensional virtual animal model having configurable shape parameters to the image-derived three-dimensional representation of the animal, or of estimating the weight of the target animal as a function of the adjusted-to-best-fit shape parameters of the virtual model.

U.S. Pat. No. 7,128,024 to Doyle, II criticizes animal weight as a poor indicator of animal growth in a cow. Doyle II discloses a system that uses image, ultrasound, and/or acoustic sensors to obtain approximate measurements of the skeletal size of a cow, which the author suggests will better correlate to the ultimate carcass weight of the cow.

U.S. Pat. No. 7,399,320 to Kriesel et al. describes various methods for volumetric and dimensional measurements of livestock. Kriesel discloses an elaborate setup of range cameras and sensors to scan and sense an animal and develop a true three-dimensional ("3D") representation of the animal. Then, from the three-dimensional data set, Kriesel's system computes the volume of the animal. In Kriesel's system, it is necessary to position the target animal or carcass in a proper position with respect to the cameras. Kriesel prefers to use a livestock scale to weigh the cow. In column 80, Kriesel remarks that an inferred weight can alternatively be calculated from the true 3D representation of the animal, without the use of scales. But Kriesel adds that an inferred weight "is presently not in use and has not been taught by current patent art." Moreover, Kriesel does not suggest inferring the cow's total weight from a virtual spatial model of the cow that has been reshaped to fit 3D representation of the animal. In column 35, Kriesel suggests using a cow model to estimate some of the hidden dimensions of a target cow, some of whose dimensions have been directly determined through image analysis of the cow's non-hidden dimensions. In column 65, Kriesel also suggests scaling an MRI model of a cow or hog to match the target animal in order to estimate the position and size of the targeted animals' internal organs, muscles, and bones, and thereby estimate production yields. But Kriesel does not disclose or suggest that one could, with a reasonable degree of accuracy, estimate the entire weight of a live target animal as a function of the adjusted-to-best-fit shape parameters of a virtual model.

SUMMARY OF THE INVENTION

The present invention provides a device for estimating the mass or weight of an object. The device includes at least one camera that captures an object representation of one or more visible or spatial characteristics of the object, a computer readable medium connected to the at least one camera to store the object representation, at least one virtual object model stored on the computer readable medium, wherein each of the at least one virtual object model comprises one or more shape variables to form a multi-dimensional profile of a reference object; a computer communicatively coupled to the computer readable medium to compare the multi-dimensional profile to the object representation through the adjustment of the one or more shape variables to form an optimal fit object representation, wherein the computer estimates the mass or weight of the object representation as a function of the optimal fit object representation.

The present invention provides a system for estimating the mass or weight of an individual animal. The device includes at least one camera that captures an animal representation of one or more visible or spatial characteristics of one or more animals a computer readable medium connected to the at least one camera to store the animal representation, at least one virtual animal model stored on the computer readable medium, wherein each of the at least one virtual animal models with one or more shape variables to form a multi-dimensional profile of a reference animal; a computer communicatively coupled to the computer readable medium to compare the multi-dimensional profile to the animal representation through the adjustment of the one or more shape variables to form an optimal fit animal representation, wherein the computer estimates the mass or weight of the animal representation as a function of the optimal fit animal representation.

The present invention includes a method for estimating the mass or weight of an individual animal by generating an animal representation image of an animal comprising one or more visible or spatial characteristic of an animal; comparing the animal representation image to a reference animal model wherein the reference animal model comprises a scalable multi-dimensional profile with one or more independently scalable shape variables; adjusting the one or more independently scalable shape variables to fit approximately the animal representation image; and estimating the mass, the weight or both of the animal as a function of the one or more independently scalable shape variables.

The present invention also includes a method for estimating the weight of an animal by generating an animal representation image having one or more visible or spatial characteristic of an animal using at least one camera; storing the animal representation image on a computer readable medium; obtaining an animal reference image comprising a scalable multi-dimensional profile with one or more independently scalable shape variables; storing the animal reference image on a computer readable medium; comparing the one or more visible or spatial characteristic of the animal representation image to the one or more independently scalable shape variables; rotating the multi-dimensional profile to at least partially orient the animal representation image and the animal representation image; translating the multi-dimensional profile to at least partially orient the animal representation image and the animal representation image; wherein the orientation of the animal representation image approximates the animal representation image orientation; adjusting the one or more independently scalable shape variables to fit approximately the animal representation image and the animal reference image; and estimating the mass, the weight or both of the animal as a function of the one or more independently scalable shape variables.

A weight estimation system is provided comprising an image-capturing apparatus, a user interface, a plurality of image processing modules, and a weight estimation module. In one preferred embodiment, the image-capturing apparatus having two cameras with lenses for producing a stereo image of an animal, an embedded computer, a power supply, a simple, single-point laser range finder, an automated lighting system, and cabling, sensors, and touchpads or other user interface devices. In addition the present invention includes a realtime laser range finder, (e.g., a Swissranger SR4000), which allows 3D models to be generated using time of flight LIDAR. The realtime laser range finder system can be substituted for the imaging camera without any change in fundamental design since it produces a grid or image of depths.

A first image processing module generates a three-dimensional point cloud from a stereoscopic image of the targeted animal. A second image processing module crops the point cloud to substantially only include the targeted animal. A third image processing module aligns a canonical virtual model of the animal with the cropped point cloud of the targeted animal. A fourth image processing model reshapes the aligned canonical virtual model of the animal to optimally fit the cropped point cloud of the targeted animal. This reshaping is accomplished through the independent adjustment of at least one independently configurable shape parameters of the virtual model to reshape the virtual model into an optimal fit with the representation of the individual animal. Finally, a mass or weight estimation module estimates the mass or weight of the targeted animal as a function of the configurable shape parameters of the virtual model.

The preferred embodiment also provides a user interface. The user interface comprises buttons or a menu for selecting an animal type or class. The interface also includes either a simple text display or a digital screen such as an LCD screen. The output interface is used to relay both the predicted weight and an error parameter related to the accuracy of the fit between the reshaped virtual model and the cropped point cloud.

Advantageously, the invention allows animals and in particular, livestock mammals to be weighed without direct contact. The invention, however, is not limited to making mass or weight estimations of cattle, livestock animals, mammals, or any other particular type of living organism.

BRIEF DESCRIPTION OF THE DRAWINGS

For a more complete understanding of the features and advantages of the present invention, reference is now made to the detailed description of the invention along with the accompanying figures and in which:

FIGS. 3-5 illustrates linear scaling of the virtual animal model along each of its three principal axes.

FIG. 6 illustrates scaling of the virtual animal model from the center of the animal in opposite directions along each of its three principal axes.

FIG. 7 illustrates a non-linear scaling of the virtual animal model.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

In describing preferred and alternate embodiments of the technology described herein, as illustrated in FIGS. 1-9, specific terminology is employed for the sake of clarity. The technology described herein, however, is not intended to be limited to the specific terminology so selected, and it is to be understood that each specific element includes all technical equivalents that operate in a similar manner to accomplish similar functions.

Figure 1:
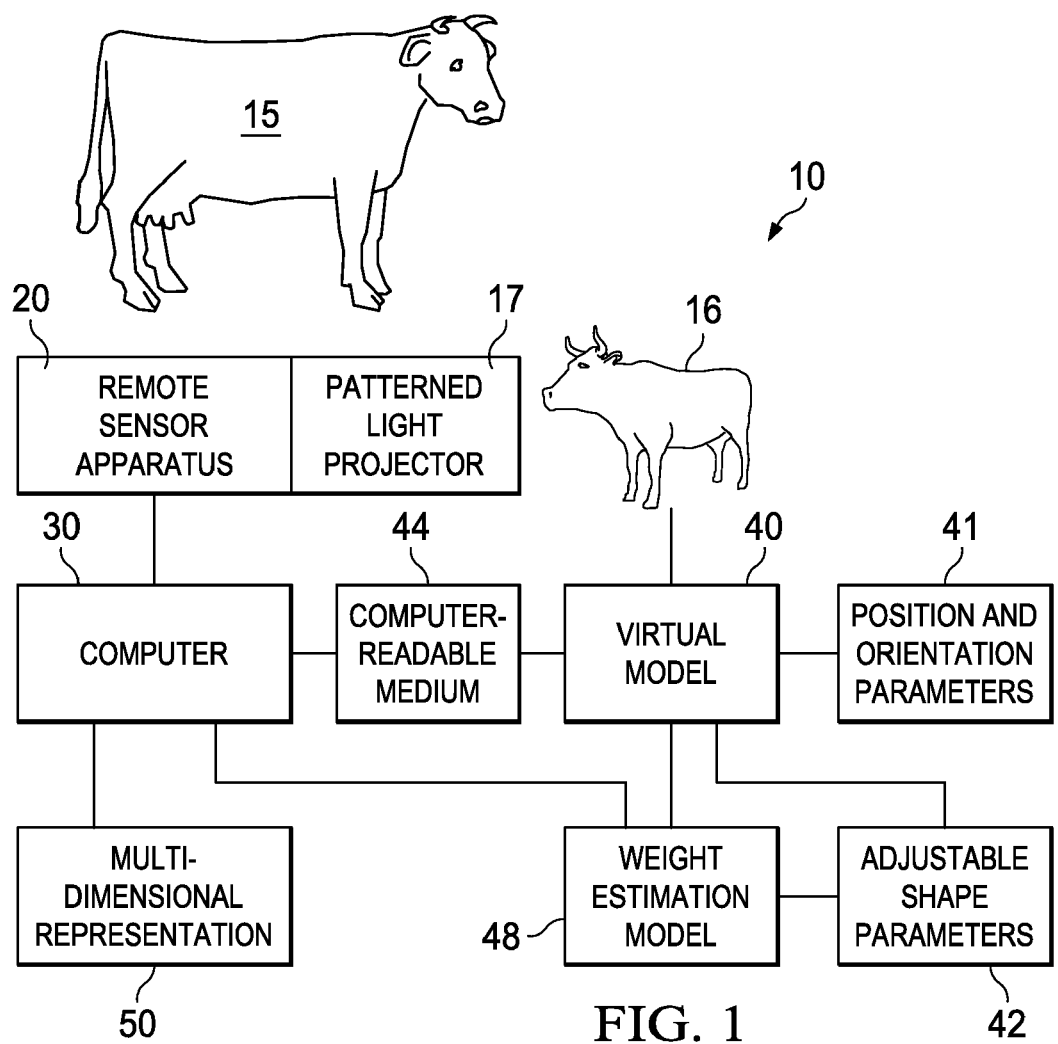
FIG. 1 illustrates one embodiment of a system for estimating the mass or weight of an individual "target" animal.

FIG. 1 illustrates one embodiment of a system 10 for estimating the mass or weight of an individual "target" animal 15. The system 10 includes a remote sensing apparatus or machine 20, a computer 30, and a virtual model 40 that provides a canonical, multidimensional profile or shape of the class of animal to which the target animal 15 belongs. The machine 20 which may include a conventional visible-spectrum camera, a stereo camera, a laser range finder, and/or an infrared or thermal imaging system generates a representation 50 of a visible or spatial characteristic of the target animal 15. Preferably, the machine 20 is portable and includes a handle (not shown) to facilitate its handheld operation. The machine 20 may also include a stabilizer to generate a more accurate representation.

The virtual model 40 provides at least a two-dimensional profile, and preferably a stereoscopic profile, of a reference animal 16. The reference animal 16 is preferably of the same species and even more preferably of the same breed as the target animal 15. The virtual model 40 is stored on a computer readable medium 44 such as a hard drive, flash memory, random-access memory, or processor memory.

The virtual model 40 is represented in a format such as a computer-aided-design (CAD) format that allows it to be translated and rotated along any of its dimensions to match the orientation of the machine-captured representation 50 of the target animal 15 and also to be reshaped via values assigned to a relatively small and easily manageable set of independently adjustable shape variables or scalable shape parameters 42 to an optimal fit of the representation 50.

For example, the virtual model 40 can be represented as a set of three-dimensional points each having X, Y, and Z coordinates. A set of three independently scalable shape parameters 42 are provided to linearly and independently scale the X, Y, and Z coordinates of each of the points. As discussed further below, other, more sophisticated sets of shape parameters 42, including nonlinear shape parameters, may be provided to reshape the virtual model 40.

The computer 30 can be used to estimate the mass or weight of the target animal 15 as a function 48 of the configurable shape parameters of the virtual model 40. For example, the function 48 may take the form of the polynomial below:

$$W = ax + by + cz + d,$$

where W is the estimated mass or weight, x, y, and z are three configurable shape parameters of the virtual model 40, and a, b, c, and d are empirically-determined coefficients. The method for determining a, b, c, and d are described below. Essentially it is a least squares using the cattle weights, and the shape parameters (x0, y0, z0) to form a matrix A=[x0 y0 z0 1 x1 y1 z1 1 xn yn zn 1] and a b vector of weights b=[w0 ... wn] and least squares is used for an overdetermined system to solve Av=b where v=[a b c d]. Different functions, each with different empirically-determined coefficients, may be provided for different genders, types, breeds, and weight classes of an animal.

In the preferred embodiment, the computer 30 can be used for identifying suitable coefficients for variables of the weight estimating function 48, wherein the variables of the weight-estimating function 48 are the same as or derived from the configurable shape parameters 42 of the virtual model 40. The configurable shape parameters 42 of the virtual model 40 are adjusted to reshape the virtual model 40 to optimally fit the representation 50. Afterwards, the computer 30 computes an estimated weight of the target animal 15 as a function of those adjusted shape parameters 42.

To facilitate the fitting process, it is advantageous to align the representation 50 of the target animal 15 with the virtual model 40 of the reference animal 16 so that the representation 50 and the virtual model 40 have substantially similar orientations. In the preferred embodiment, this is accomplished by adjusting spatial position and orientation variables 41 (which are distinguishable from the virtual model's configurable shape parameters 42) that represent a relative spatial position and orientation of the virtual model 40. Spatial position and orientation variables that represent the relative spatial position and orientation of the representation 50 may also be adjusted to facilitate the alignment process.

To facilitate rapid translation and rotation of the virtual model 40, the computer 30 preferably comprises multiple 64-bit or higher processors located on one or more processor cores, including at least one processor optimized for image processing. The computer 30 is at least communicatively coupled to, and optionally also structurally joined with, the machine 20.

Figure 2:
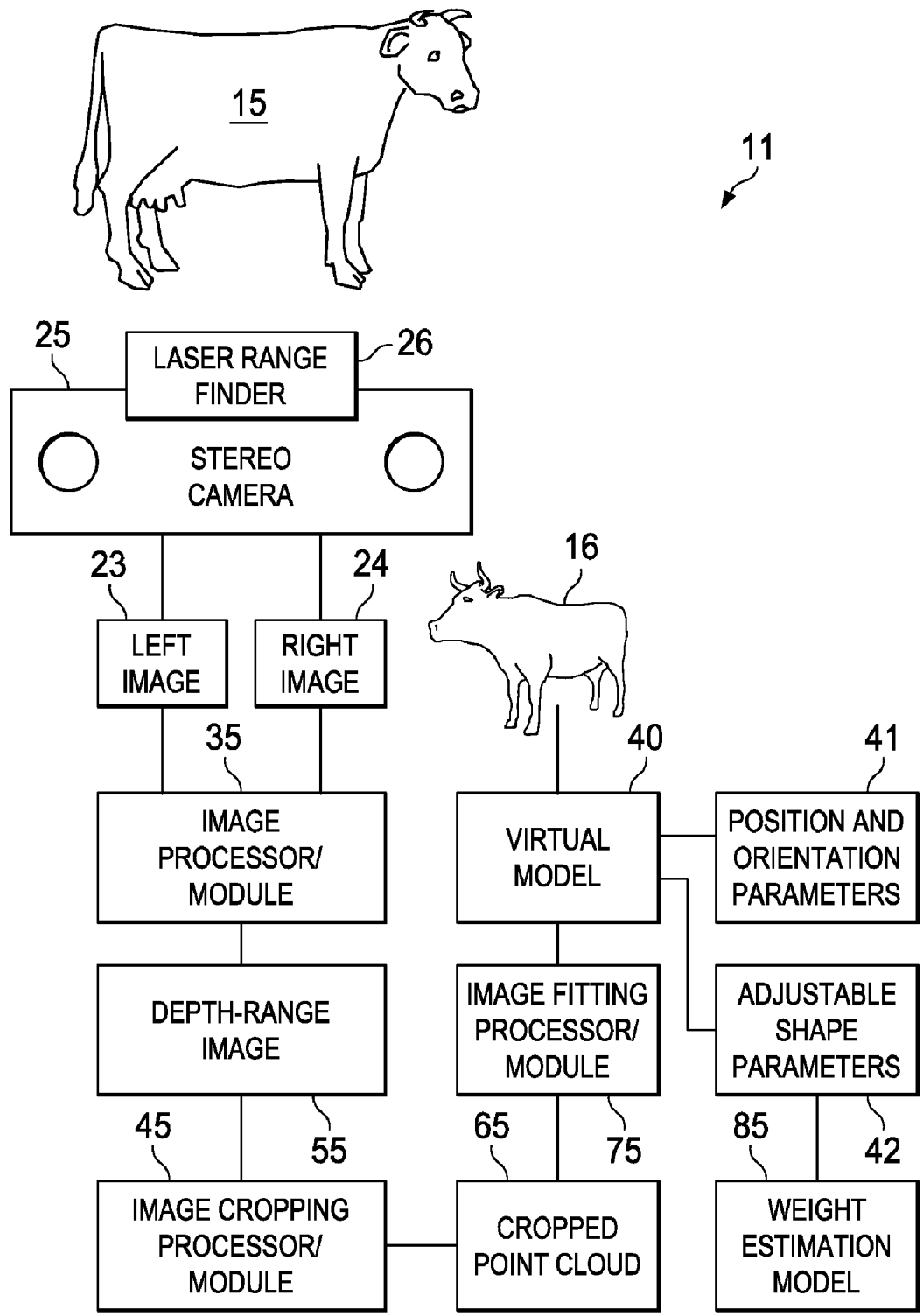
FIG. 2 illustrates another embodiment of a system for estimating the mass or weight of a target animal.

FIG. 2 presents a more particular embodiment of a system 11 for estimating the mass or weight of an individual "target" animal 15 using the reference animal 16. In FIG. 2, the machine 20 comprises a stereo camera 25 such as the POINT GREY™ BUMBLEBEE 2 stereo vision camera system. The machine 20 optionally also includes a single-point laser range finder 26 to identify the distance from the camera to a single point on the imaged individual "target" animal 15. Although the laser range finder 26 is not necessary, it improves the accuracy of stereoscopic image processing and image segmentation routines. The stereo camera 25 includes two structurally interconnected, spaced-apart imagers. The imagers are spaced no more than 2 feet apart, and preferably, less than 6 inches apart, to make the system 11 more portable and amenable to handheld operation.

The stereo camera 25 simultaneously captures left and right images 23 and 24 of the target animal 15. Then, using software, an image processor 35 or a multi-purposed processor such as computer (not shown) processes the two images to generate a stereoscopic depth-range image 55 of the target animal 15. The depth-range image 55 is a three-dimensional representation, but is not a fully rotatable "true" three-dimensional representation of the entire surface area of the target animal 15. Rather, the depth-range image 55 consists of a projection of the target animal 15 on an image plane coupled with depth data. The depth data provides the estimated relative depth from the perspective of the camera of each point in the representation.

In some instances it can be advantageous to crop out substantially all of the animal's surroundings, leaving substantially only a representation of the target animal 15 itself, and then convert the depth-range image 55 into a point cloud 65. Accordingly, FIG. 2 provides an image cropping processor 45, which may be distinct from or one and the same as the image processor 35 or a multi-purposed processor particularly programmed with an image cropping module, to crop or segment the representation 55. The image cropping processor 45 produces a cropped, stereoscopic, camera-facing, partial surface profile, in the form of a point cloud 65, of the target animal 15.

In one embodiment, the image cropping processor 45 provides a user with tools to crop the scenery in the representation 55 surrounding the represented animal. In another embodiment, the image cropping processor 45 can be used to distinguish the target animal 15 from the surrounding scene, rotate and translate the virtual model 40 into an orientation that approximately matches an orientation of the point cloud representation 65 of the individual animal 15, and also to adjust the shape parameters 42 of the virtual model 40 to reshape it to optimally fit the point cloud representation 65 of the individual animal 15.

Next, system 11 provides an image-fitting processor 75, which may be distinct from or one and the same as image processor 35 or image cropping processor 45 or a more multipurposed processor (such as computer 30) particularly programmed with an image-fitting module. In a basic embodiment, the image-fitting processor 75 provides a user with tools or input commands that enable the user to direct the translation, rotation, and reshaping of the virtual model 40. The virtual model 40 can be super positioned with the point cloud 65 prior to alignment to at least partial align the virtual model 40 with the point cloud 65. The virtual model 40 can than be substantially aligned with, but not yet reshaped to optimally fit, the point cloud 65.

The present invention covers several different embodiments of a process of aligning the model 40 and cropped point cloud 65 to have substantially the same orientations. In one embodiment, the image-fitting can be used to either emphasize the matching of, or matches only, selected or essential features (e.g., the torso but not the head) of the virtual model 40 to the point cloud 65. In another 12 embodiment, the image-fitting can be used to match the point cloud 65 to a canonical virtual model mesh. In this and other embodiments, an floor or ground may be used to facilitate the alignment process.

Next, the animal model 16 was aligned to the cropped point cloud data 65. An iterative process was used to rotate, translate, and adjust the shape parameters of the animal model in order to minimize the distance from the animal model to the point cloud data. A variety of optimization process may be used for this optimization including a least squares mathematical model, gradient descent, or a hand method used an L2 distance norm between the animal model and the cropped point data 65.

Finally, the system 11 provides a mass or weight estimation module 85. The mass or weight estimation module 48 generates an estimated mass or weight based upon the adjusted shape parameters 42 of the virtual model 40.

One of the many benefits of the present invention is its relatively simple structural setup, compared to other image-based volume estimation systems. Whereas many prior art designs require contact with or highly restrictive confinement of livestock, in order to guide them into a suitable position with respect to an array of cameras, the present invention is suitable for mobile realtime and easily redeployable implementations.

Different approaches to reshaping the animal model were attempted. In one embodiment, which proved to be both suitable and straightforward, the model was linearly scaled along each of its three principal axes, as illustrated in FIGS. 3-5. Another embodiment, illustrated in FIG. 6, used six scalable parameters. The center of the animal model was identified and the animal model was independently scaled from the center of the animal model in six directions, all lying along the principal axes of the animal model. A nonlinear scaling approach, illustrated in FIG. 7, was also tested. The nonlinear model also used the principal axes of the animal model. From the center of each principal axis, the model is linearly stretched (or compressed), but only inside a given boundary.

Next, the estimated weight of the stereo-imaged target animal was determined by plugging the adjusted shape parameters for the animal model into a formula that predicted weight as a function of those variables. A fairly common "leave-one-out" statistical method was used in which cycling through all 31 cattle and building models from the other 30 cattle to predict that one cattle is known as the "leave-one-out" statistical method. For testing purposes, 31 different formulas were tested. Each of the 31 formulas was generated using comparisons between the actual measured weights of 30 cattle and the shape parameters that were generated to fit each of the cattle.

Next, each of the 30 formulas ware used as a model for predicting the weight of the remaining animal 15 that was not used to generate the formula. The average absolute error was 26.09 pounds, which compares to an average cattle weight of 366.4 pounds. When taken over all 31 cattle, the average error was 0.4 pounds, because some of the cattle weighed more than the model prediction and some of them weighed less. The test surprisingly demonstrated that even with a single crude virtual model applied to cattle with a wide range of weights, the system accurately predicted the weight of the cattle within 30 pounds, an error rate of less than 10%.

In FIG. 1, the system 10 was tested both with and without the use of a projector 17 operable to project patterned light, more particularly, a 7 by 7 grid of HeNe green laser light, onto the target animal 15. It was found that stereo images that lacked the benefit of the projection of patterned light were only slightly noisier than those images that had that benefit. It is still possible, however, that in some circumstances for example, when taking pictures of a black livestock animal the projection of patterned light will substantially improve the image processor's 35 ability to identify corresponding pixels in the left and right images.

The system 10 was also tested using a laser scanner instead of a stereo camera. The point clouds generated by the stereo camera were much noisier than those generated by a laser scanner. It was surprising, however, was that in spite of the noise, the stereo camera still produced relatively accurate estimates.

In the tested embodiment, only a single virtual animal model was used. More accurate estimates might be obtained by employing a family of virtual animal models. For example, different animal models might be employed for different weight categories (e.g., a different model for every 200-300 pounds) and for different postures (e.g., the animal's head raised or the animal's head lowered to the ground for grazing). In two embodiments, the computer 30 would can be used to select one of a plurality of animal models predicted to provide the best fit, or perform an optimal fit of each of a plurality of animal models to the point cloud 65. In the latter embodiment, the computer 30 could either derive an estimated weight based on two or more of the plurality of optimally fit animal models, or calculate the estimated weight based on a single animal model that was determined to provide the most accurate fit to the point cloud 65.

Figure 8:
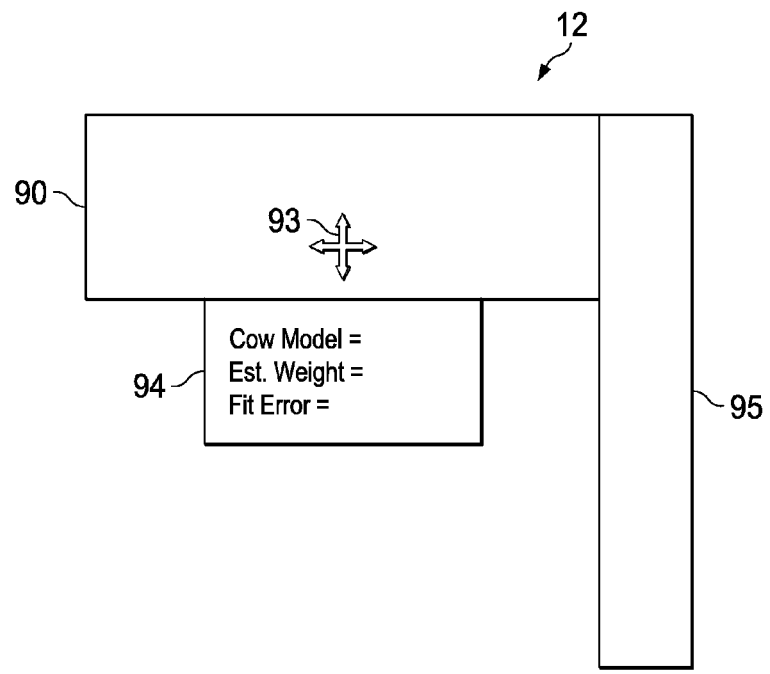
FIGS. 8 and 9 illustrate the front and back, respectively, of a portable, structurally integrated system for remotely estimating the mass or weight of an animal.
Figure 9:
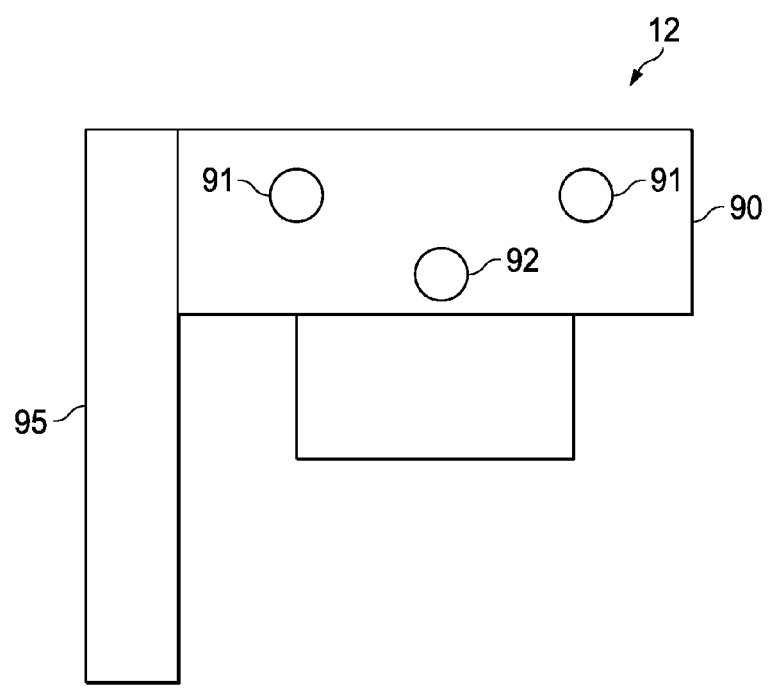

FIGS. 8 and 9 illustrate the front and back, respectively, of a portable, structurally integrated system 12 for remotely estimating the weight of an animal. The system 12 includes two stereo camera imagers 91 and a single-point laser-range finder 92 on the front of the body 90. The system 12 further comprises a user input interface 93 and output screen 94 on the back of the body 90. The system 12 may also include a standard optical viewfinder (not shown). A computer 30 (not shown), capable of performing stereo image processing, segmentation, and virtual-model-fitting fitting functions, and the weight-estimating function as well, is integrated into the body of the device.

The user input interface 93 drives a menu that enables a user to select an animal type or class (and associated virtual animal model), and to adjust various camera and laser range finder settings. The user input interface 93 also includes an LCD screen 94 that is operable, as a digital viewfinder, to display an image produced by the system 12. The LCD screen 94 is also operable to display text relaying both the predicted weight and an error parameter related to the accuracy of the fit between the reshaped virtual model and the cropped point cloud.

The system includes a handle 95 to enable a user to hold the system 12. Preferably, the system 12 is small enough (e.g., to fit entirely within a 12, 24 or 36-inch-diameter sphere), and is light enough weighs (e.g., less than 15 pounds) to be easily transported.

The invention was tested with a group of thirty-one cattle that ranged in weight from between 174 and 523 pounds. For evaluation and model-building purposes, the weight or mass of each individual animal was measured using a conventional livestock scale. The difference between the measured weight or mass of the individual animal and the estimated weight or mass of the individual animal was calculated.

Stereoscopic images were taken of each animal using a POINT GREY™ BUMBLEBEE 2 stereo vision camera system. The images were taken attempting to keep the camera from pointing directly into bright sunlight. In some cases, a tarp was erected to reduce the sunlight. In other cases, the pictures were taken in a direction away from the sun.

The camera system included two color-capable progressive scan CCDs with a resolution of 640×480 pixels at 48 frames per second or 1024×768 pixels at 20 frames per second. The camera system also included lenses, spaced 12 cm apart, with 2.5 mm, 3.8 mm, and 6 mm focal lengths with 100 degree, 65 degree, and 43 degrees fields of vision, respectively. Although the skilled artisan will recognize that other sizes and spacings may be used. Each picture was taken at a distance of about 10-30 feet from the animal. Image acquisition and camera control were accomplished using POINT GREY'S FLYCAPTURE SDK.

The images captured by each CCD were rectified and stereo processed using POINT GREY'S™ TRICLOPS SDK. The TRICLOPS SDK accomplishes two key tasks of stereo vision processing correspondence and calibration. First, it identifies which pixels in the two images correspond with each other that is, match the same feature using a sum of absolute differences algorithm. Second, it identifies for each pixel in the image the corresponding ray in 3D space. The point cloud was then converted into a texture-mapped 3D data and cropped using 3D modeling software such as 3D Studio Max.

A computer-aided-design (CAD) model of a canonical cow was downloaded from the Internet, specifically, from http://people.sc.fsu.edu/~burkardt/data/smf/cow.smf. The model appeared to be a model of an idealized representation of a cow rather than a scanned representation of any actual, particular, individual cow. The animal model was represented in the form of a set of three-dimensional points, each with three coordinates.

The invention may be applied not only to cattle, livestock animals, and mammals (including humans) generally, but also to other living organisms. Preferably, the virtual model 40 is of a characteristic animal of a class of animals (e.g., the same species; the same species and breed; the same species, breed, and gender; the same species, breed, gender and approximate age) to which the target animal 15 belongs.

Different sets of configurable shape parameters are also contemplated. In one embodiment for a three-dimensional virtual model, exactly three independently configurable shape parameters would be provided to linearly stretch or contract the virtual model along each of the model's primary axes. In another embodiment, different shape parameters would be provided to adjust the height of only the leg portion of the virtual model versus the overall height of the virtual model.

In another embodiment, a laser is used to scan an animal and acquire a three dimensional depth map. The depth map is compared to a canonical shape volume for the animal under consideration. The distortion of the local depth map to the canonical shape volume is used to estimate the volume of the animal. A thermal image is used to estimate the fat-to-muscle ratio of the animal. The fat to muscle ratio is used as an estimate of the density of the animal. The two factors, density and volume, are then combined to predict the mass of the animal.

In yet other embodiments, (1) the software includes a learn mode to develop the coefficients; (2) the animal model is rotated 180 degrees and a best fit is attempted in that opposite orientation, and the weight estimate derived from the 180 degree orientation as well; (3) automatic gain control is used for lighting; (4) automatic exposure settings are utilized; and (5) IR filters are used on the stereo camera.

For the calculation of the animal model, the skilled artisan will understand that various computer programs may be used. For example, the first software module loads a cropped point cloud and a canonical animal model. Both the cropped point cloud and the canonical animal model are graphically displayed on the screen using a 3D rendering program based upon OpenGL (a library of graphics routines). The center of both objects are used to provide an initial translation so they occupy the same region of space. If the canonical animal model faces the opposite direction of the cropped point cloud, then the canonical animal model is rotated 180 degrees about the up direction. Then the canonical animal model is further translated to overlap with the cropped point cloud. Next, the shape parameters on the canonical animal model are adjusted so that the canonical animal model matches the same general body size as the cropped point cloud. At each stage, an error can be computed and displayed which computed the average Euclidean distance of the closest N % of the cropped point cloud points to the canonical animal model. Both the numerical error and the graphical display provided verifications of the correctness of the 3D alignment and shape parameter adjustments. At the completion of the iterative process, the shape parameters are displayed and stored.

The second software module was used to determine the model for predicting the weight. The shape parameters for all test animals of a given type with a known weight was entered into a matrix. An additional column of ones was added to the matrix. Then least squares was used to determine a linear fit to the function $w = as\_x + bs\_y + cs\_z + d$ where $(s\_x, s\_y, s\_z)$ are shape parameters, w is the weight and a, b, c, and d are coefficients of the model. As a result the model is constructed but the weight has not been calculated. The learned coefficients (a,b,c,d) and the known shape parameters $s\_x, s\_y, s\_z$ can be used to compute the estimated weight.

To test the prediction capability of the system, given N+1 animals of the same type with corresponding N+1 weights and N+1 sets of shape parameters, a model was constructed from a subset of N, and used to compute the weight of remaining animal. This is the leave-one-out statistical cross validation method and produces a total of N+1 independent predictions between the testing and training data.

It will be understood that the particular configurations of many of the embodiments and their elements could be changed without departing from the spirit of the present invention. It will also be understood that although the invention is illustrated and was tested in reference to cattle, the invention is generally applicable to other livestock animals, ungulates, mammals, and non-mammalian animals and living organisms. It will also be understood that to the extent this application uses the term "cow," it is meant as a singular, non-gender- and non-age-specific equivalent of the plural term "cattle." Other colloquial references to a "singular cattle" include "a head of cattle," "an ox," "a bovine," "a beast," and "a cattle beast." The invention is believed to be as useful for bulls, steers, calves, and heifers as it is for mature female cattle.

Having thus described exemplary embodiments of the present invention, it should be noted that the disclosures contained in FIGS. 1-9 are exemplary only, and that various other alternatives, adaptations, and modifications may be made within the scope of the present invention. Accordingly, the present invention is not limited to the specific embodiments illustrated herein, but is limited only by the following claims.

An embodiment of the invention was tested using several modules of software code, including the following. cattleDriver.cpp: This file contains the main ( ) function the entry point of the program. face.cpp/.hpp: These files contain methods for creating normals for the vertices. ioctree.cpp/.hpp: The files create and manage Octrees. matrix.cpp/.hpp: The files create and manage matrixes by using the LAPACK libraries for calculations. mesh.cpp/.hpp: The files create and manage the mesh data model. point3D.cpp/.hpp: The files provide mathematical operations on map points. point3DH.cpp/.hpp: The files provide mathematical operations on map points. r_valarray.cpp/.hpp: 1998-2008 Template class for Point3D, Point3DH, Vector3D classes for data management. trackball.cpp/.hpp: (c) Copyright 1993, 1994, Silicon Graphics, Inc. Code that emulates trackball functionality with a mouse. vector3D.cpp/.hpp: The files create and manage the three dimensional vectors. meshViewer.cpp/.hpp.

The program also utilized several third party libraries, including the following: GLUT: OpenGL Utility Toolkit version 3.7: The website http://www.opengl.org/resources/libraries/glut/ describes this library as follows: "It implements a simple windowing application programming interface (API) for OpenGL. GLUT makes it considerably easier to learn about and explore OpenGL programming. GLUT provides a portable API so you can write a single OpenGL program that works across all PC and workstation OS platforms."

LAPACK: Linear Algebra PACKage, version 3.2: The website http://www.netlib.org/lapack/ describes this library as follows: "LAPACK is written in Fortran 90 and provides routines for solving systems of simultaneous linear equations, least-squares solutions of linear systems of equations, eigenvalue problems, and singular value problems. The associated matrix factorizations (LU, Cholesky, QR, SVD, Schur, generalized Schur) are also provided, as are related computations such as reordering of the Schur factorizations and estimating condition numbers. Dense and banded matrices are handled, but not general sparse matrices. In all areas, similar functionality is provided for real and complex matrices, in both single and double precision." BLAS Basic Linear Algebra Subprograms: The website http://www.netlib.org/blas/faq.html describes this library as follows: "The BLAS (Basic Linear Algebra Subprograms) are routines that provide standard building blocks for performing basic vector and matrix operations. The Level 1 BLAS perform scalar, vector and vector-vector operations, the Level 2 BLAS perform matrix-vector operations, and the Level 3 BLAS perform matrix-matrix operations. Because the BLAS are efficient, portable, and widely available, they are commonly used in the development of high quality linear algebra software, LAPACK for example.

The program also utilizes two POINT GRAY software development kits. The FLYCAPTURE SDK is used for capturing the stereo images from the camera. Its use requires the actual BUMBLEBEE 2 camera to be attached. The TRICLOPS SDK is used for actual processing of the stereo images received from the camera. It can operate on files saved via the FLYCAPTURE SDK, and therefore, does not require the camera to be attached during usage.

The present invention provides a device for estimating the mass or weight of an object. The device includes at least one camera that captures an object representation of one or more visible or spatial characteristics of the object, a computer readable medium connected to the at least one camera to store the object representation, at least one virtual object model stored on the computer readable medium, wherein each of the at least one virtual object model comprises one or more shape variables to form a multi-dimensional profile of a reference object; a computer communicatively coupled to the computer readable medium to compare the multi-dimensional profile to the object representation through the adjustment of the one or more shape variables to form an optimal fit object representation, wherein the computer estimates the mass or weight of the object representation as a function of the optimal fit object representation.

The present invention provides a device for estimating the mass or weight of an object, the nature of the object is not relevant to the application of the present device. As a result the object can be an animal, a plant, bacteria, or a human. Similarly, the object need not be animate at all and can be a tree, a building, a fruit, a vegetable, a statute, a column, a rock to a mountain or any other object that can be imaged.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The cattle program generates a matrix of shape scaling values. These values along with the actual measured weight of the cow were input into the following Matlab script that determined the estimated weights and errors from the actual weights.

We claim:

1. A system for estimating the mass or weight of an individual animal comprising:
    at least one camera that captures an animal representation of one or more visible or spatial characteristics of one or more animals;
    a computer readable medium connected to the at least one camera to store the animal representation;
    at least one virtual animal model stored on the computer readable medium, wherein each of the at least one virtual animal model comprises one or more shape variables to form a multi-dimensional profile of a reference animal;
    a computer communicatively coupled to the computer readable medium to compare the multi-dimensional profile to the animal representation through the adjustment of the one or more shape variables to form an optimal fit animal representation, wherein the computer estimates the mass or weight of the animal representation as a function of the optimal fit animal representation;
    wherein the multi-dimensional profile is rotated, translated or both to form an orientation that approximately matches an orientation of the animal representation;
    wherein the animal representation comprises a projection of the animal on a plane and includes depth data corresponding to an estimated distance from the plane to each point of the animal being projected onto the plane.

2. The system of claim 1, further comprising a projector operable to project a light grid onto the individual animal.

3. The system of claim 1, wherein the at least one camera comprises a stereo camera to generate a stereo image.

4. The system of claim 1, wherein the system further comprises a laser range finder in communication with the computer.

5. The system of claim 1, wherein the at least one virtual animal model, the animal representation or both are three-dimensional representations.

6. The system of claim 1, wherein the multi-dimensional profile is rotated and translated to match the orientation of the animal representation to form substantially similar orientations.

7. A method for estimating the mass or weight of an individual animal comprising:
    generating an animal representation image of an animal comprising one or more visible or spatial characteristic of an animal;
    comparing the animal representation image to a reference animal model wherein the reference animal model comprises a scalable multi-dimensional profile with one or more independently scalable shape variables;
    adjusting the one or more independently scalable shape variables to fit approximately the animal representation image; and
    estimating the mass, the weight or both of the animal as a function of the one or more independently scalable shape variables;
    wherein the adjusting step comprises rotating, translating or both of the virtual model of the reference animal to match the orientation of the representation of the animal;
    further comprising the steps of projecting an image of the animal in a plane to include-depth data corresponding to an estimated distance from the plane to each point of the animal being projected onto the plane.

8. The method of claim 7, further comprising the step of aligning the animal representation image with the reference animal model to have substantially similar orientations.

9. The method of claim 7, further comprising the steps of: measuring an weight or mass of the animal; and calculating the difference between the measured weight or mass of the animal and the estimated weight or mass of the animal.

10. The method of claim 7, wherein the animal representation image is a photographic image, infrared image, visible-spectrum image, combination thereof.

11. The method of claim 7, wherein the model of the reference animal model is an idealized representation of an animal rather than a representation of any actual, particular, individual animal.

12. The method of claim 7, wherein the animal is a livestock animal.

13. The method of claim 7, wherein the animal is a cow, a human, a cat, an elephant, a horse, a whale or other animal.

14. A method for estimating the weight of an animal comprising the steps of:
    generating an animal representation image comprising one or more visible or spatial characteristic of an animal using at least one camera;
    storing the animal representation image on a computer readable medium;
    obtaining an animal reference image comprising a scalable multi-dimensional profile with one or more independently scalable shape variables;
    storing the animal reference image on a computer readable medium;
    comparing the one or more visible or spatial characteristic of the animal representation image to the one or more independently scalable shape variables;

rotating the multi-dimensional profile to at least partially orient the animal representation image and the animal representation image;

translating the multi-dimensional profile to at least partially orient the animal representation image and the animal representation image; wherein the orientation of the animal representation image approximates the animal representation image orientation;

adjusting the one or more independently scalable shape variables to fit approximately the animal representation image and the animal reference image; and estimating the mass, the weight or both of the animal as a function of the one or more independently scalable shape variables.

15. A system for estimating the mass or weight of an object comprising:

at least one camera that captures an object representation of one or more visible or spatial characteristics of the object;

a computer readable medium connected to the at least one camera to store the object representation;

at least one virtual object model stored on the computer readable medium, wherein each of the at least one virtual object model comprises one or more shape variables to form a multi-dimensional profile of a reference object;

a computer communicatively coupled to the computer readable medium to compare the multi-dimensional profile to the object representation through the adjustment of the one or more shape variables to form an optimal fit object representation, wherein the computer estimates the mass or weight of the object representation as a function of the optimal fit object representation;

wherein the multi-dimensional profile is rotated, translated or both to form an orientation that approximately matches an orientation of the animal representation;

wherein the animal representation comprises a projection of the animal on a plane and includes depth data corresponding to an estimated distance from the plane to each point of the animal being projected onto the plane.

* * * * *